United States P
Leibowitz

3,753,609
Aug. 21, 1973

[54] LIQUID CRYSTAL DISPLAY
[75] Inventor: Marshall Leibowitz, Englewood, N.J.
[73] Assignee: Ing. C. Olivetti and Co., S.p.A., Ivnea, Italy
[22] Filed: Dec. 8, 1971
[21] Appl. No.: 205,864

[52] U.S. Cl............................. 350/160 LC, 340/166
[51] Int. Cl. ................................................ G02f 1/16
[58] Field of Search............................. 350/160 LC; 313/109.5, 201; 315/169 R; 340/166 EL

[56] References Cited
UNITED STATES PATENTS

| | | | |
|---|---|---|---|
| 3,674,342 | 7/1972 | Castellano et al. | 350/160 LC |
| 3,646,384 | 2/1972 | Lay | 315/169 R |
| 3,503,672 | 3/1970 | Marlowe | 350/160 LC |
| 3,647,958 | 3/1972 | Sobel | 315/169 TV |

Primary Examiner—Edward S. Bauer
Attorney—Kevin McMahon

[57] ABSTRACT

A liquid crystal display in which a layer of liquid crystal material is confined between a pair of substrates in which two sets of parallelly disposed electrodes are disposed on one of the substrates at an angle with one another with a layer of dielectric material between the sets. Excitation voltage is applied between selected adjacent pairs of electrodes from each of the sets for energizing a selected portion of the liquid crystal material. A biasing electrode may be disposed on the other of said substrates for decreasing the field necessary to cause excitation of the liquid crystal material.

4 Claims, 4 Drawing Figures

Patented Aug. 21, 1973

3,753,609

INVENTOR.
MARSHALL LEIBOWITZ

LIQUID CRYSTAL DISPLAY

BACKGROUND OF THE INVENTION

Liquid crystals, such as those of the nematic type which operate on the principle of dynamic scattering, have optical properties which make them suitable for alphanumeric, television and other types of displays, light shutters, etc. Such liquid crystals, when in the unexcited state, are relatively transparent, and when in the excited state, reflect the major portion of the incident light.

Liquid crystal displays are generally constructed by confining a layer of liquid crystal material between a pair of electrodes which are deposited on the interior faces of a pair of substrates, at least one of the substrates and the electrodes deposited thereon being transparent. An electric field applied between the electrodes causes the portion of the liquid crystal material therebetween to become excited and to scatter incident light.

It has been suggested in U.S. Pat. No. 3,499,702 to Goldmacher et al., to use a matrix type of electrode construction in which a plurality of horizontal electrodes are deposited on one substrate, while a plurality of vertical electrodes are deposited on the other substrate. In order to excite the liquid crystal material at a point in the display, an excitation voltage is applied to the horizontal and vertical electrodes crossing at that point, thereby exciting the liquid crystal material at their intersection.

This display uses the standard liquid crystal excitation technique in which the electric field is applied across the portion of the layer of liquid crystal material to be excited.

SUMMARY OF THE INVENTION

According to the invention, Applicant deposits both the horizontal and the vertical electrodes of a matrix type liquid crystal display on one of the substrates with a dielectric layer deposited therebetween. In order to energize a particular portion of the display, a voltage is applied between the pair of adjacent horizontal electrodes and the pair of adjacent vertical electrodes intersecting at the desired point. The fringing field around the electrodes causes the liquid crystal material in the area defined by the intersection of the energized pairs of electrodes to become excited. A biasing electrode may be deposited on the other substrate and a biasing voltage applied between it and one of the other pairs of electrodes in order to reduce the magnitude of the voltage needed to cause scattering.

DETAILED DESCRIPTION

Figure 1:
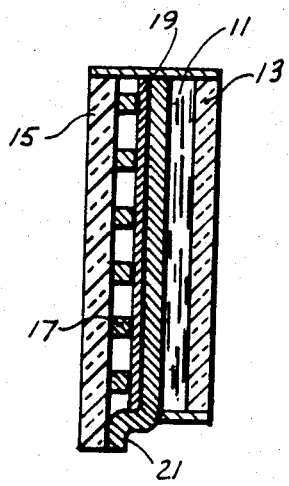
FIG. 1 is an edge view of a liquid crystal display, according to the invention.
Figure 2:
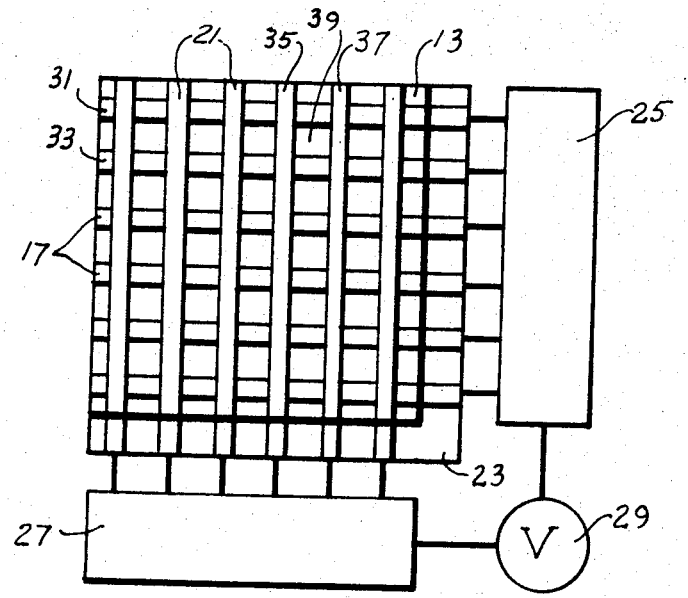
FIG. 2 is a top view of the display of FIG. 1.

Referring to FIGS. 1 and 2 of the drawings, a layer of liquid crystal material 11 is confined between a pair of substrates 13 and 15, at least one of which is transparent. A set of parallelly disposed electrode strips 17 is deposited on the substrate 15 perpendicular to the plane of FIG. 1. A dielectric layer 19, which may, for instance, consist of silicon monoxide, barium oxide, or aluminum oxide, is deposited over the electrode strips 17. A second set of parallelly disposed electrode strips 21 are deposited over the dielectric layer 19 at an angle with the electrode strip 17, in this case, perpendicular, to form a matrix-type grid. The width and separation of adjacent electrodes is not critical. Electrode widths on the order of 5 mils and separations on the order of 10 mils have been found suitable, but different ones could just as easily be used.

As can be seen in FIG. 2, in the illustrated embodiments a portion 23 of the substrate 15 extends beyond the area of the display. The electrodes 27 and 21 also extend over the portion 23 for allowing connections with external circuits to be made to them. The electrodes 17 are connected to row driving circuits 25, while the electrodes 21 are connected to column driving circuits 27. The row and column circuits 25 and 27 are connected to the excitation voltage source 29, and apply the excitation voltage from source 29 between selected pairs of adjacent row electrodes 17 and column electrodes 21.

Thus, for instance, referring to FIG. 2 of the drawings, if the row driving circuit 25 and column driving circuit 27 apply the voltage from the voltage source 29, between the pair of row electrodes 31 and 33 and the pair of column electrodes 35 and 37, the fringing electric field around the electrodes causes the liquid crystal material in the area 39 defined by the intersection of the electrodes 31 through 37, is excited and scatters light. The magnitude of the voltage necessary to cause scattering depends on the liquid crystal materials, the distance between adjacent electrodes 17 and 21, and the parameters of the dielectric material 19. Generally it ranges between 30 and 50 volts. Applied voltages having frequencies between 50 and 500 hertz have been found to be suitable.

The electrodes 17 and 21 may be formed by techniques and materials well known in the art. The thickness necessary for the layer of dielectric material 19 depends on the dielectric strength of the material and on the magnitude of the applied voltages. For insulating layers 19 formed of silicon monoxide, thicknesses on the order of 1 micron have been found suitable.

Figure 3:
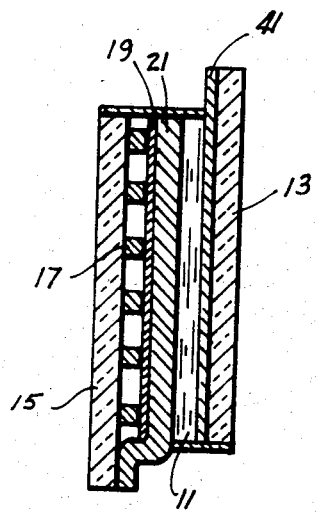
FIG. 3 is an edge view of a second embodiment of the liquid crystal display, according to the invention.
Figure 4:
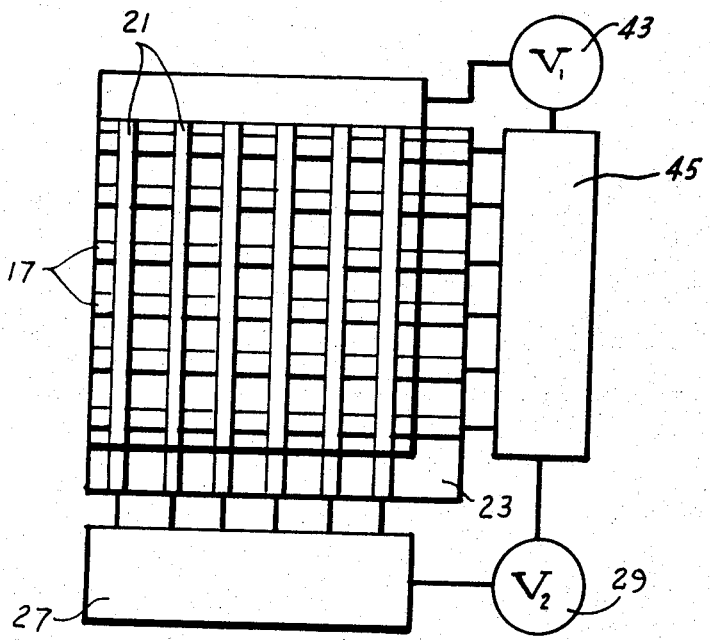
FIG. 4 is a top view of the display of FIG. 3.

A second embodiment of the invention which requires lower excitation voltages is illustrated in FIGS. 3 and 4 of the drawings. This embodiment is in most respects similar to that illustrated in FIGS. 1 and 2 of the drawings, and corresponding parts are numbered identically.

As in the embodiment of FIGS. 1 and 2, a liquid crystal layer 11 is confined between a pair of substrates 13 and 15. Two sets of parallel electrodes 17 and 21 are deposited on the interior face of substrate 15 at right angles to one another with a dielectric layer 19 deposited therebetween.

In order to decrease the magnitude of the voltage needed to excite selected portions of the liquid crystal material 11, a biasing electrode 41 is deposited on the interior face of a substrate 13. It is thought that the use of the biasing electrode 41 distorts the fringing electric field around the excited ones of the electrodes 17 and 21 and causes a larger portion of it to exist in the liquid crystal material, thereby resulting in a larger electric field within the liquid crystal material for a given excitation voltage.

As seen in FIG. 4, according to this embodiment of the invention, a biasing voltage V1 is applied by means of the voltage source 43 between the bias electrode 41 on substrate 13 and the row electrodes 17 through row driving circuit 45. Voltage source 29 applies a driving voltage V2 between selected adjacent pairs of row electrodes 17 and column electrodes 21 through row driving circuit 45 and column driving circuit 27. The row and column driving circuits 45 and 27 and voltage source 29 may operate in the same manner as was described in relation to the embodiment in FIG. 2. Voltages V1 and V2, which should be isolated from one another, may have frequencies ranging between 50 and 500 hertz, the exact limits depending on the liquid crystal material. The frequencies of the driving and bias voltages are not critical and do not have to be the same.

For liquid crystal material MBBA, and a bias voltage V1 of 5 volts, the switching threshold is achieved when the driving voltage V2 is on the order of 5 volts and full excitation of the selected area is achieved with the driving voltage V2 equal to about 15 volts. Of course, other values of the driving and bias voltages can also be used.

It is possible to use other permutations of the electrodes 17, 21 and 41 in applying the bias voltages and driving voltages. For instance, the bias voltage V1 could be connected between the column electrodes 21 and the electrode 41. The arrangement shown is preferred, however, since it results in the layer of dielectric material 19 being between both the driving circuit electrodes and the biasing circuit electrodes, thereby allowing the use of low frequency AC or pulsed DC in the manner described in patent application Ser. No. 177,733 filed on Sept. 3, 1971, and now abandoned without decreasing the life of the liquid crystal material 11. The use of pulsed DC driving and bias voltages also simplifies the row and column driving circuitry 45 and 27.

If polarized filters are used in conjunction with the display, it may also be used in a polarization mode rather than in the dynamic scattering mode described above. This polarization mode is described in an article entitled, "Voltage-dependent Optical Activity of a Twisted Nematic Liquid Crystal" appearing in the Applied Physics Letters, V18, No. 4, Pg. 127, Feb. 15, 1971.

I claim:

1. A liquid crystal display having a layer of liquid crystal material confined between a pair of substrates comprising:
   a first plurality of parallelly disposed electrodes on one of said substrates;
   dielectric material covering said first plurality of electrodes;
   a second plurality of parallelly disposed electrodes deposited on said one substrate over said dielectric material at an angle with said first plurality of electrodes;
   means for applying an excitation voltage between a selected pair of adjacent electrodes of said first plurality and a selected pair of adjacent electrodes of said second plurality to create a fringing field which excites the liquid crystal material in the region defined by the intersection of the two excited pairs of electrodes;
   a bias electrode deposited on the other of said substrates; and
   means for applying a biasing voltage between said bias electrode and the electrodes of one of said plurality of parallelly disposed electrodes for reducing the magnitude of the required excitation voltage.

2. The liquid crystal display of claim 1 wherein said second plurality of parallelly disposed electrodes is deposited on a substrate at right angles to the electrodes of said first plurality of parallelly disposed electrodes.

3. The liquid crystal display of claim 1 wherein said bias voltage is applied between said bias electrode and the electrodes of said first plurality of parallelly disposed electrodes.

4. The liquid crystal display of claim 1 wherein said means for applying an excitation voltage includes row and column driving circuits and a source of driving voltage connected between said row and column driving circuits.

* * * * *